(12) United States Patent
Richley et al.

(10) Patent No.: US 6,700,556 B2
(45) Date of Patent: Mar. 2, 2004

(54) DISPLAY SHEET WITH STACKED ELECTRODE STRUCTURE

(75) Inventors: Edward A. Richley, Gaithersburg, MD (US); David K. Biegelsen, Portola Valley, CA (US)

(73) Assignee: Xerox Corporation, Stamford, CT (US)

( * ) Notice: Subject to any disclaimer, the term of this patent is extended or adjusted under 35 U.S.C. 154(b) by 312 days.

(21) Appl. No.: 09/916,149

(22) Filed: Jul. 26, 2001

(65) Prior Publication Data

US 2003/0020685 A1 Jan. 30, 2003

(51) Int. Cl.[7] ................................................. G09G 3/34
(52) U.S. Cl. .......................................... 345/84; 359/228
(58) Field of Search ............................... 345/30, 48, 49, 345/55, 84, 107; 359/223, 228, 291, 296

(56) References Cited

U.S. PATENT DOCUMENTS

| | | | | | |
|---|---|---|---|---|---|
| 4,558,314 A | * | 12/1985 | Fooshee | ...................... | 345/107 |
| 4,583,824 A | * | 4/1986 | Lea | .............................. | 359/223 |
| 5,192,197 A | * | 3/1993 | Culp | ........................... | 417/322 |
| 5,222,895 A | * | 6/1993 | Fricke | ......................... | 434/113 |
| 5,717,283 A | | 2/1998 | Biegelsen et al. | .......... | 313/483 |
| 5,956,005 A | | 9/1999 | Sheridon | ...................... | 345/84 |
| 5,992,820 A | * | 11/1999 | Fare et al. | .............. | 251/129.01 |

* cited by examiner

*Primary Examiner*—Richard Hjerpe
*Assistant Examiner*—Alexander Eisen
(74) *Attorney, Agent, or Firm*—Linda M. Robb

(57) ABSTRACT

An internal field activated display sheet is disclosed which comprises a medial plane disposed between reservoirs in the display sheet. The reservoirs communicate with each other through apertures in the medial plane, which includes a plurality of conductors. At least one of the reservoirs is filled with a liquid means, which is responsive to a peristaltic internal field developed within the medial plane. Applying a field across selected apertures in the medial plane causes the liquid means to be electrically pumped from one reservoir into the other, thereby displaying an image.

20 Claims, 10 Drawing Sheets

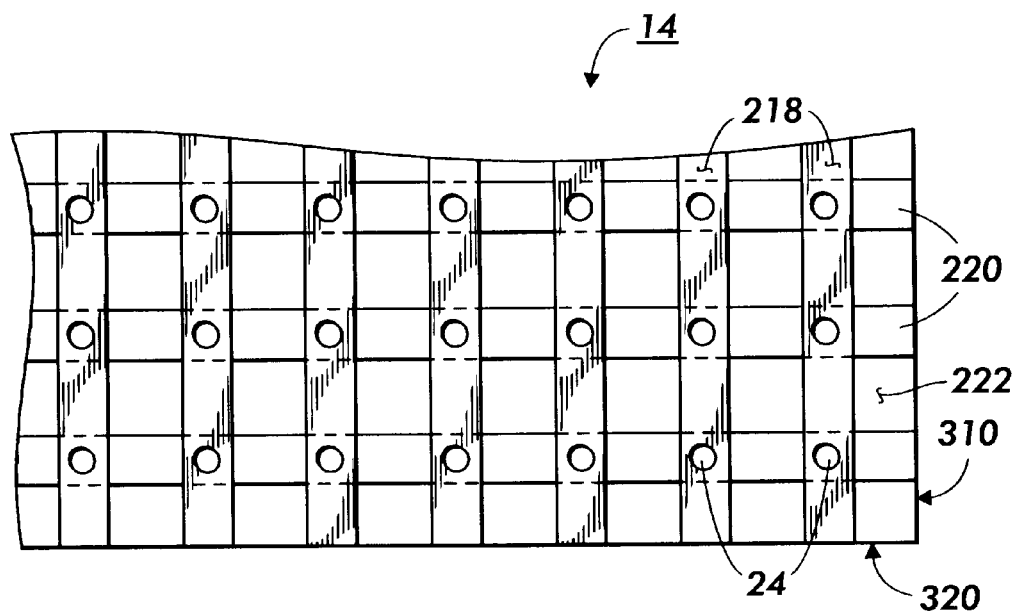
FIG. 3A
FIG. 3B
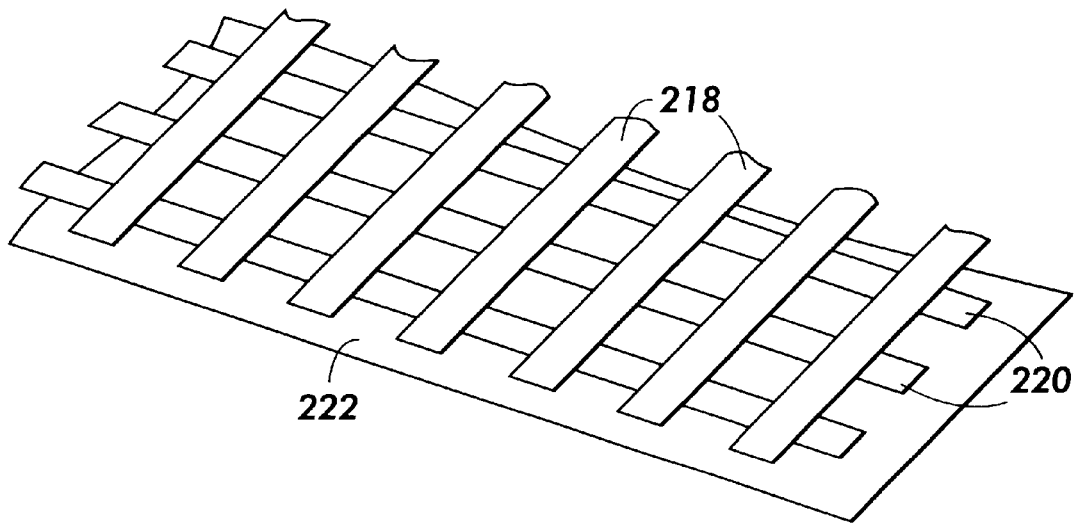

DISPLAY SHEET WITH STACKED ELECTRODE STRUCTURE

INCORPORATIONS BY REFERENCE

The following patent application is hereby incorporated by reference into this application: U.S. patent application Ser. No. 09/216,829 by Biegelsen et al. titled "Ferrofluidic Electric Paper".

BACKGROUND OF THE INVENTION

This invention relates generally to internal field activated display sheets and more particularly concerns an internal field activated display sheet which utilizes liquid in a plurality of reservoirs in which the liquid can be moved from each reservoir into an open space and can be moved back into the reservoir by applying an electric field to the liquid.

Typically, a display device, in sheet form, comprises a thin sheet, which has many attributes of a paper document. It looks like paper, has ambient light valve behavior like paper (i.e. the brighter the ambient light, the more easily it may be seen), is flexible like paper, can be carried around like paper, can be written on like paper, can be copied like paper, and has nearly the archival memory of paper.

There have been different approaches to making a field induced display sheet such as U.S. Pat. No. 5,956,005 titled "Electrocapillary Display Sheet which Utilizes an Applied Electric Field to Move a Liquid Inside the Display Sheet", in which the display sheet utilizes three transparent parallel sheets spaced from each other. The medial plane has a plurality of reservoirs, which are filled with a dyed or pigmented ink. Each of the reservoirs has an individually addressable voltage source to create an individual electric field. Ink from a reservoir flows into the space between the medial plane and one of the other two sheets with the application or removal of an electric field.

An alternate approach was disclosed in U.S. Pat. No. 5,717,283 titled "Display Sheet with a Plurality of Hourglass Shaped Capsules Containing Marking Means Responsive to External Fields", in which the display sheet contains a plurality of hourglass shaped capsules for each pixel of an image. Each hourglass shaped capsule contains ink in one of its chambers. With the application of an external electric field, ink is moved from one chamber to the other in each hourglass shaped capsule to display an image. Visibility of the ink is otherwise blocked by an opaque medial plane.

Although these approaches, utilizing a standard vertical electric field, are useful, it is desirable to improve on their performance. Accordingly, it is an object of this invention to provide a means for more effectively moving material within electric paper pixels than is possible with a standard vertical electric field.

SUMMARY OF THE INVENTION

Briefly stated, and in accordance with one aspect of the present invention, there is provided an internal activated display sheet including a medial plane disposed between a first and second reservoir. Apertures in the medial plane permit communication between the first and second reservoirs. At least one of the reservoirs is filled with a liquid responsive to an internal peristaltic field developed within the medial plane, which includes a plurality of conductors. Applying an internal field across selected apertures in the medial plane causes liquid to move from one reservoir to the other.

In an alternate aspect of the invention there is provided a method for activating a display sheet having a first non-conductive sheet, a plurality of first reservoirs, a plurality of second reservoirs located beneath the first reservoirs, a medial plane containing conductive means interposed between the first and second reservoirs. Apertures in the medial plane permit communication between the first and second reservoirs. At least one of the reservoirs is filled with a liquid means. A peristaltically driven internal field within the medial plane pumps the liquid means from at lease one of the filled reservoirs into one of the reservoirs not containing the liquid means.

BRIEF DESCRIPTION OF THE DRAWINGS

The foregoing and other features of the instant invention will be apparent and easily understood from a further reading of the specification, claims and by reference to the accompanying drawings in which:

FIG. 3A shows a portion of the top view of the medial plane of this invention;

FIG. 3B shows a perspective view of the three conductive layers of the medial plane;

DETAILED DESCRIPTION OF THE INVENTION

Figure 1:
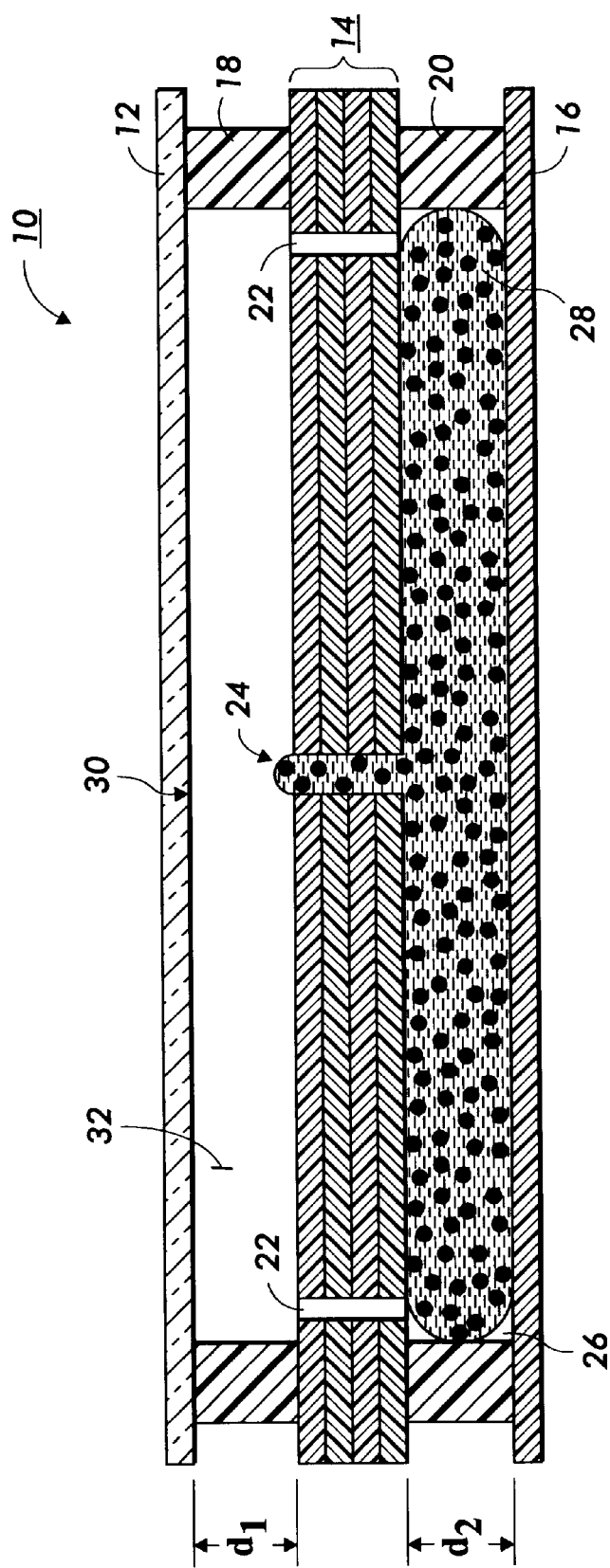
FIG. 1 shows a pixel wide cross sectional view of one embodiment of the electric display sheet of this invention.

Referring to FIG. 1, there is shown a pixel wide cross sectional view of an embodiment of the display sheet 10 of this invention. The display sheet 10 comprises a transparent and insulating sheet 12, such as glass or Mylar, an opaque sheet 16, a medial plane 14, and intermediate layers 18 and 20. Transparent as used herein shall mean "having low optical absorption so that objects may be easily seen on the other side". Intermediate layer 20 forms walls for a hidden lower reservoir 26, medial plane 14 forms a top layer for the lower reservoir 26 and the bottom of a viewable upper reservoir 30, and intermediate layer 18 forms walls for the upper viewable reservoir 30. The layers may be thermocompressively bonded together, using adhesive layers (wherein the patterned adhesive may suffice for layers 18 and 20), or the layers could be deposited one on top of the other by any means known in the art. Apertures 22 and 24 are defined in medial plane 14. Apertures 22 provide vapor or liquid return vents through medial plane 14. Aperture 24 forms a passageway which controls passage of a coloring fluid 28 between the upper reservoir 30 and the lower reservoir 26. In one embodiment, the coloring fluid 28 is provided in the lower reservoir 26. The coloring fluid 28 has a color that contrasts with the color of sheet 14 and intermediate layer 18. In this first exemplary embodiment, the coloring fluid 28 is low surface energy, non-transparent and non-white in color, such as black. Surfaces of apertures 24 are created or treated to be wetting to coloring fluid 28. Coloring fluid 28, which may be transparent and be colored by neutrally buoyant pigment or dye, may include dyed or pigmented non-polar liquids such as Dow Corning 200 Series silicone oil, Exxon Isopar or 3M Fluorinert and mixtures of these and other suitable liquids. (Polar, e.g. water based, fluids can be used if the conductivity is sufficiently low and if fields are low enough to avoid hydrolysis.) Alternatively, coloring fluid 28 may comprise a conducting fluid, for example an organic dielectric liquid such as isopar, with charge directors to add charge pairs (positive and negative) to the fluid. As described above, the conducting fluid may be non-transparent and non-white, such as black, or it may be a transparent fluid colored by neutrally buoyant pigments or dyes. In this embodiment coloring particles or pigments carried by the liquid are not necessarily charged.

For purposes of simplicity hereinafter, the following discussion will describe embodiments in which coloring fluid 28 comprises a conducting fluid carrying neutrally buoyant, uncharged pigment particles. However, one skilled in the art will appreciate that the display sheet disclosed herein would also operate beneficially with insulating fluids containing charged pigmented particles.

The reservoir 30 and apertures 22 can be filled with a liquid 32 such as water, alcohol, ethylene glycol and mixtures of these and other suitable liquids. The two liquids 28 and 32 are immiscible. The liquid 32 may be clear, dyed or pigmented with a contrasting color to liquid 28. The reservoir 30 and apertures 22 may also be filled with a gas such as air. Alternatively, a single transparent (and not dyed) conducting fluid can uniformly fill both lower and upper reservoirs. Then pigment is pumped with the fluid between reservoirs but is not allowed to recirculate along with the liquid through fluid return vents 22.

In any of the above cases the display is bistable. That is, after writing into the hidden or revealed state the image is non-volatile due to surface tension constraints (arising from curvature forces and/or surface coatings.) The bottom sheet 16 forms a carrier layer that may be opaque, or white. The bottom layer 16, the medial plane 14, and the intermediate layer 20 define the boundaries and dimensions of the hidden lower reservoir 26. The upper reservoir 30 is formed by the intermediate layer 18 and the transparent cover layer 12. The volume of the lower reservoir 26 needs to be at least as large as the volume of the upper reservoir 30. The volume of the lower reservoir is primarily controlled by the thickness of the intermediate layer 20. The distance $d_1$ between sheets 12 and 14 and the distance $d_2$ between sheets 14 and 16 both are in the range between 0.0001 and 0.05 inches.

Figure 2:
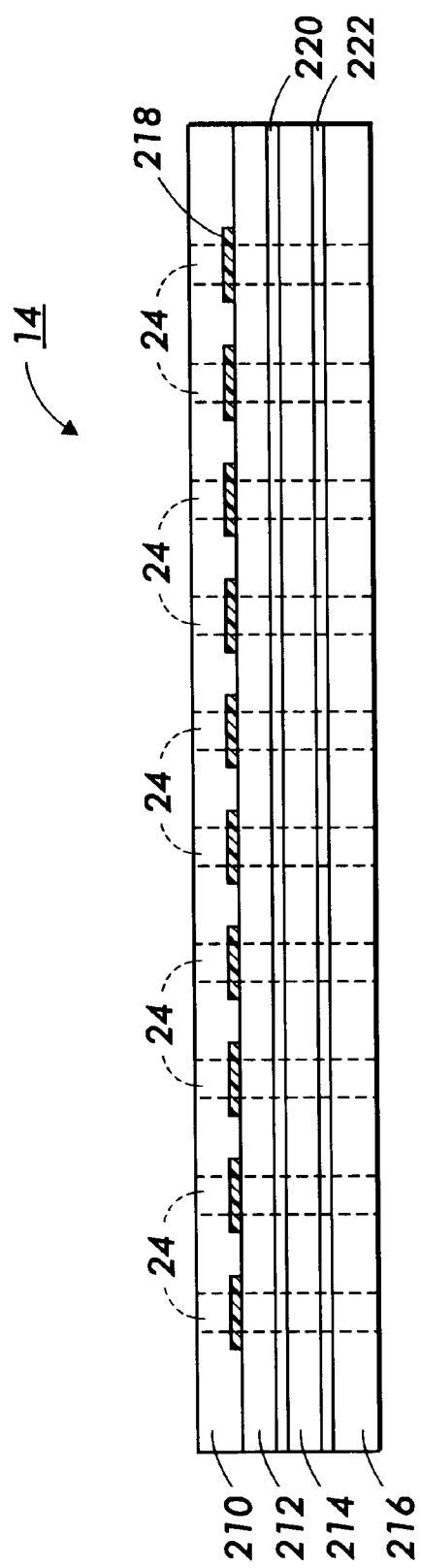
FIG. 2 shows a multi-pixel cross sectional view of the medial plane of one embodiment of the electric display sheet of this invention.

Referring to FIG. 2, there is shown a cross sectional view of medial plane 14 of one embodiment of this invention. In this embodiment, medial plane 14 comprises seven layers 210, 212, 214, 216, 218, 220 and 222. Layers 210, 212, 214 and 216 are each a thin, flexible, white (layer 210 only), opaque and highly reflective material such as $TiO_2$-filled polymer membrane, Mylar®, Lexan®, Plexiglas®, ceramic, etc. Electric field generating elements 218, 220 and 222 are interposed (e.g. by deposition on the top surfaces of 212, 214, and 216 respectively, or on the bottom surfaces of 210, 212, and 214 respectively) to form a stacked electrode structure. Electric field generating elements 218, 220 and 222 are comprised of any conductive material such as aluminum. In FIG. 2, apertures 24 have the same properties and serve the same purpose as in FIG. 1. Apertures 22 have been omitted for clarity.

Figure 3C:
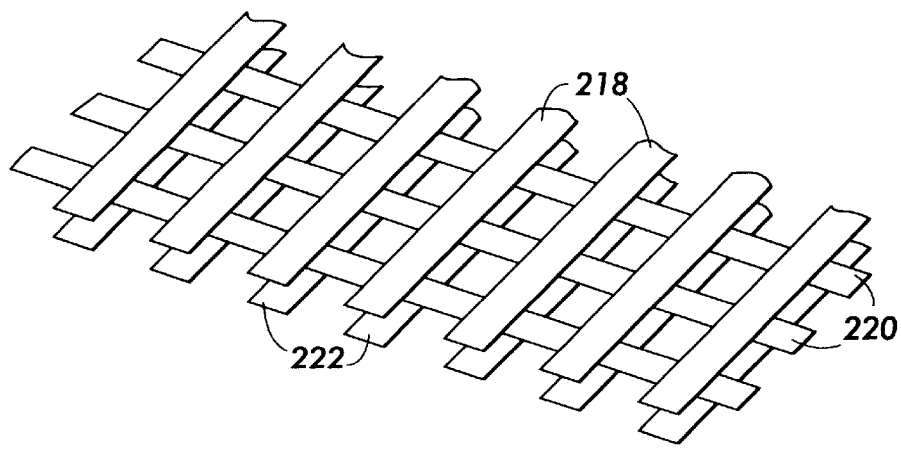
FIG. 3C shows a perspective view of an alternate embodiment for the three conductive layers of the medial plane.

Referring to FIG. 3A, there is shown a top view of medial plane 14. Conductive strips 218 are patterned on layer 212 and form lines (columns) parallel to the edge 310 of medial plane 14. Conductive strips 220 are patterned on layer 214 and form lines (rows) parallel to the edge 320 of medial plane 14. As indicated in FIG. 3A, conductive unpatterned layer 222 is placed on layer 216 and all points within the plane are set at the same voltage. It should be clear that patterns chosen for metal layers 218, 220, and 222 can be interchanged, and that the unpatterned plane, as shown in perspective view in FIG. 3B, can in fact be patterned. For example, if layers 218 and 220 are patterned into column and row strips, respectively, as above and layer 222 is patterned into column strips vertically displaced below columns in layer 218 (FIG. 3C), then separate phases can be applied to the columns of layer 222 to extend the set of operations that can be achieved. In the following description, layer 222 will initially be taken to be patterned as in FIG. 3C. The conductive elements 218, 220 and 222 are all fabricated by well-known methods of depositing and patterning a conductive material such as metal or polysilicon and may be encapsulated. For example, polyester sheets can be aluminized uniformly by sputtering and patterned into aluminum stripes by laser ablation in a roll to roll process. Apertures 24 have the same properties and serve the same purpose as in FIG. 1. Apertures 22 have been omitted from FIG. 3C for clarity. The crossing points of conductive strips 218 and 220 align with at least one corresponding aperture 24. The crossing points can be larger than the apertures 24 in order to each activate more than one aperture 24. When the elements 218, 220 and 222 are activated with mutually phased waveforms $P_1$, $P_2$, and $P_3$, a moving electric field wave, a peristaltic wave, is created which causes the fluid in the corresponding reservoir to move from one reservoir to another, as described in more detail hereinbelow. The peristaltic fields separate charge pairs locally, but transport both signs of charge in the same direction. The fields drive the charged species, which in turn viscously drag the fluid, which in turn drags the pigment particles (if pigment particles are used). Conductive layers 218, 220 and 222 are connected to control logic, not shown, from the edges of sheet 10 by any well-known means such as edge connectors.

Referring to FIGS. 4A–D, there is shown three different phased waveforms $P_1$, $P_2$, and $P_3$ that are applied to conductive layers 218, 220 and 222, respectively, to write a particular pixel, that is, to move pigment from below to above the medial plane. The waveforms may be either digital voltage signals or analog voltage signals. For simplicity in the discussion, digital phased waveforms will be described in this embodiment. Referring to FIGS. 4A–D and 5, in operation, medial plane layer 216 is adjacent to reservoir 26 holding conductive liquid 28. The liquid 28 may be a conductive fluid containing charge directors, as described above.

Figure 4A:
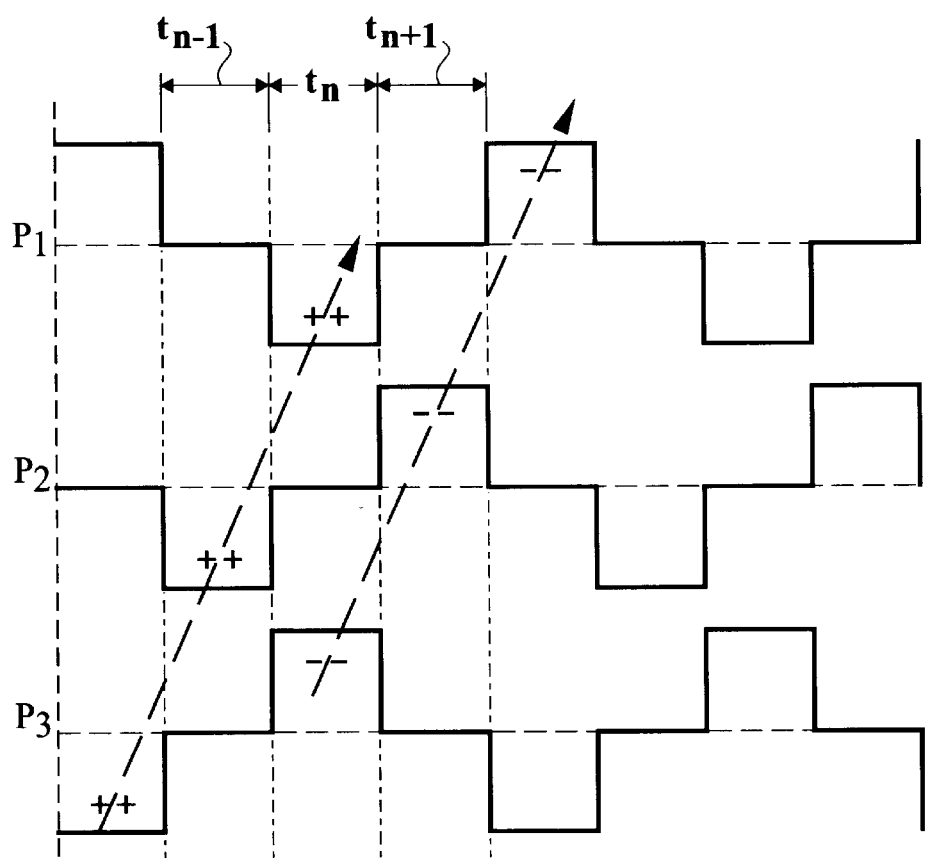
FIG. 4A shows an approximately sinusoidal phased waveform that is applied to the conductive layers of the medial plane.

The phased digital waveforms $P_1$, $P_2$, and $P_3$ are applied to the conductive layers 218, 220, and 222 through a known control logic. The control logic has a selection architecture such as multiplexers or programmable logic array (PLA) to select a given electrode at a given time. As shown in FIGS. 4A and B, an approximately sinusoidal voltage wave is applied to the three electrodes 218, 220, and 222. A positive (negative) voltage here can be thought of as corresponding to an accumulation of positive (negative) charge in the electrode. This charge attracts oppositely charged species in the liquid and repels similarly charged species. The net neutral liquid is thus locally polarized, but no long distance charge separation is induced. The conductivity of the resultant fluid is adjusted to be low enough that field screening does not occur and approximately all charges in the liquid between the electrodes are separated. Field strengths and charged species mobilities are chosen so that drift times are comparable with switching times and are much shorter than diffusion times.

In order to support an applied field, the concentration of mobile ions in the liquid must be sufficiently low. For voltages V and spacings d, the simple application of Poisson's equation to the electrode region shows that the concentration of ions must be less than $$\epsilon \cdot \epsilon_0 \cdot V/(q_0 \cdot d^2),$$

where $\epsilon$ is the relative permittivity (usually 2–4 for organic liquids) and $\epsilon_0$ is the permittivity of free space (8.85e-12F/m), V is the typical voltage on the electrodes (10V for this example), $q_0$ is the ion charge (1.6e-19 C for most ions) and d is the electrode spacing (10 microns for this example). This gives a typical ion concentration of 1.1e19 m$^{-3}$. Mobilities for ions in these liquids are found in the literature to be typically in a range of from 1e-9 to 1e-8 m$^2$/V$^{-s}$, so that the corresponding fluid conductivity (the product of ion concentration and mobility) is somewhere around 2 to 20 nS/m.

Once the voltage and spacings have been selected, the wave speed must be determined. In order to drag the ions effectively, it is necessary that the wave speed be somewhat less than the drift speed of the fastest ions. In that manner, the ions of each sign will stay separated from their opposites, and follow the potential profile as it travels along the length of the aperture. There will be no ion "slippage" and hence mixing of positive and negative ions, which would tend to reduce the effectiveness of the pumping action. The highest drift speed one would expect would be determined from the product of mobility and the highest electric field in the system, that is, $\mu V/d$, or, with the above numbers, 1e−2 m/s. The traveling speed of the wave would necessarily be a bit less than this value. The frequency of the phased voltages is then determined by the wave speed and the wavelength. The wavelength is determined by the electrode spacing, and for a 3-phase system is 3·d. The frequency is then the wave speed divided by the wavelength, or for this example, about 30 Hz.

The resultant force on the liquid is determined by the force exerted on the fluid by that quantity of ions being dragged at the wave speed. The resulting force per unit area and per unit length is given by $$nq_0v_r/\mu,$$

where n is the ion concentration (1.1e19 m$^{-3}$), $v_r$ is the wave speed (1e−2 m/s), and $\mu$ is the ion mobility. For the present example, this is approximately 2e7 N/m$^3$, or the equivalent to a pressure gradient of about 200 bar/m. This can then be used to determine the flow rate through the aperture.

While these numbers are chosen for particular voltages and spacings, it should be understood that higher voltages, smaller spacings, and higher concentrations could be used. By combination of the above relations, it can be shown that a scaling law for the fluid force is limited according to the relation $$\epsilon \cdot \epsilon_0 \cdot V^2/d^3,$$

so that, as long as breakdown is avoided, the force scales with voltage squared. Organic liquids can typically withstand field strengths of several megavolts per meter, so that for 10 micron spacings, fluid forces of 1.6e7 N/m$^3$, or 160 bar/m are possible, although at voltages of 30V. Spacings smaller than 10 microns help to reduce the necessary voltage and, at the same time, increase the force on the fluid.

Figure 4B:
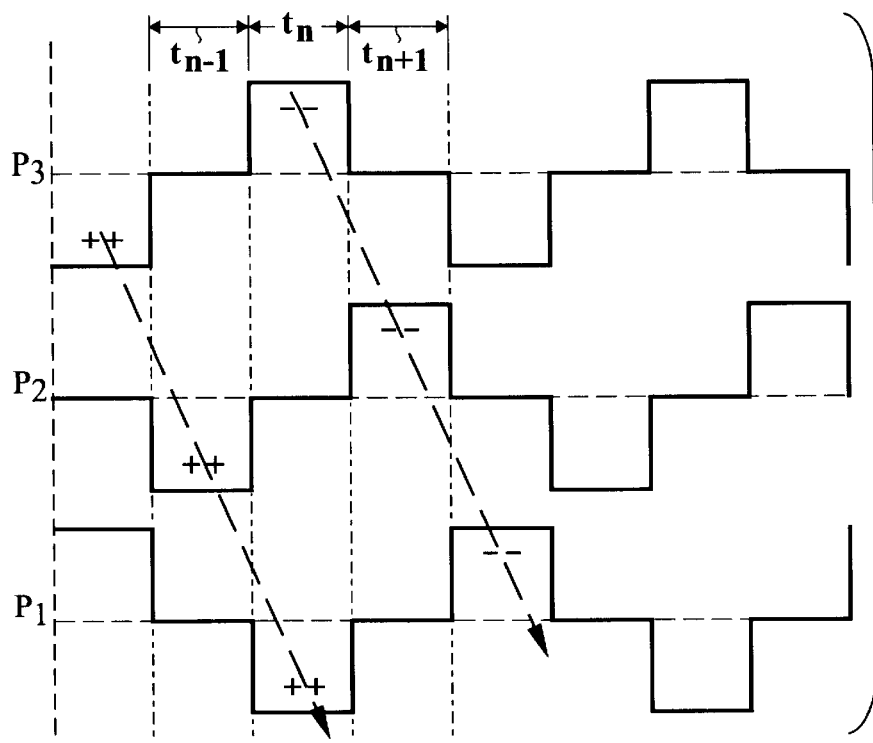
FIG. 4B shows the waveform of FIG. 4A with the phasing reversed and applied to the conductive layers of the medial plane.
Figure 4C:
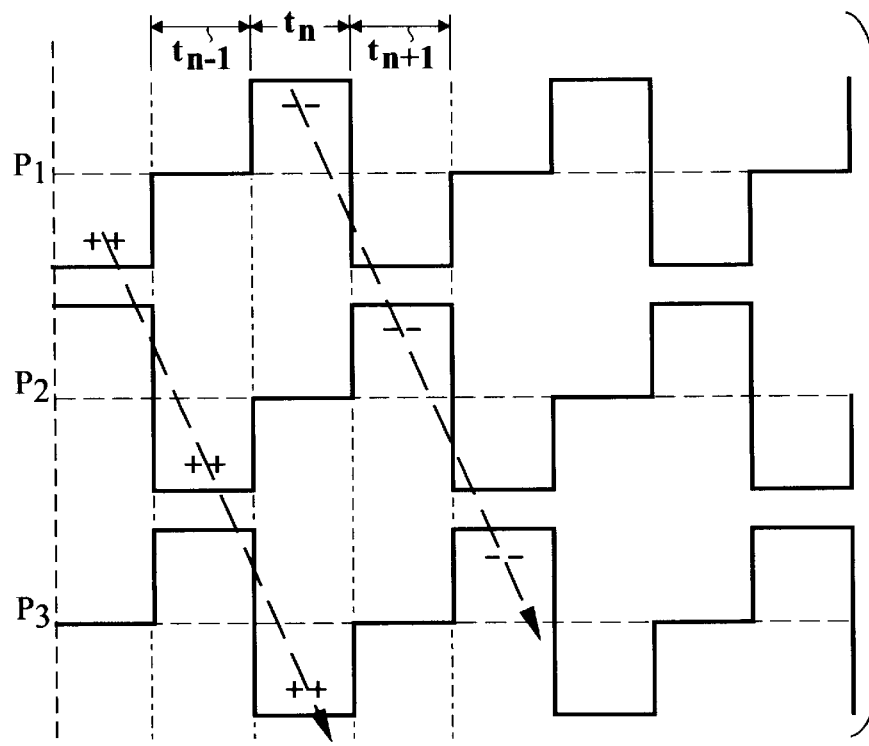
FIG. 4C shows an approximately sawtooth phased waveform that is applied to the conductive layers of the medial plane.

As seen in FIG. 4A for a sinusoidal-like sequence, and FIG. 4C for a sawtooth-like sequence, the voltages are changed and a wave-like voltage pattern is shifted across the medial plane. Note that both positive and negative charged species are transported in the same direction, so called 'ambipolar' transport. The moving charged species drag the fluid and its contents along. In FIG. 4a charges are driven peristaltically upward in time, thereby pumping fluid and suspended pigment upward through the orifice 24. In the indicated configuration, this is a 'write' operation. As seen in FIG. 4b reversing the phasing applied to the electrodes reverses the wave direction, which in turn reverses the fluid transport. This represents an 'erase' operation.

In a display system each pixel must be put into its own state. The present system is able to support passive matrix addressing wherein a single row at a time is selected, and pixels at the intersection with each column within the row are selectively and simultaneously driven in a single selected direction. Thus, as shown in FIG. 3c, phase $P_2$ is applied to a given row in plane 220, $P_1$ is applied to each column in layer 218 and $P_3$ is applied to each column in layer 222 which is being addressed for writing. Peristaltically phasing $P_1$, $P_2$, $P_3$ drives fluid from the bottom reservoir to the top reservoir (writing). The voltages are switched synchronously through their cycles many times until all the pigment has been transferred. Simultaneously, in the case that layer 222 is also patterned into columns as in FIG. 3C, or in another time interval if layer 222 is unpatterned as in FIG. 3b, other pixels in the same row can be driven as $P_3$, $P_2$, $P_1$ (on layers 218, 220 and 222, respectively) to drive fluid in the opposite direction (erasing.) In the case of FIG. 3C all pixel setting is completed after addressing each row once with no frame erase required. In the case of FIG. 3B each row can be addressed only once if preceded by a frame erase. Alternatively each row can be addressed twice: once to write selected column crossings and once again to erase the remaining column crossings. Each row is similarly addressed in turn until the entire display has been set.

Figure 4D:
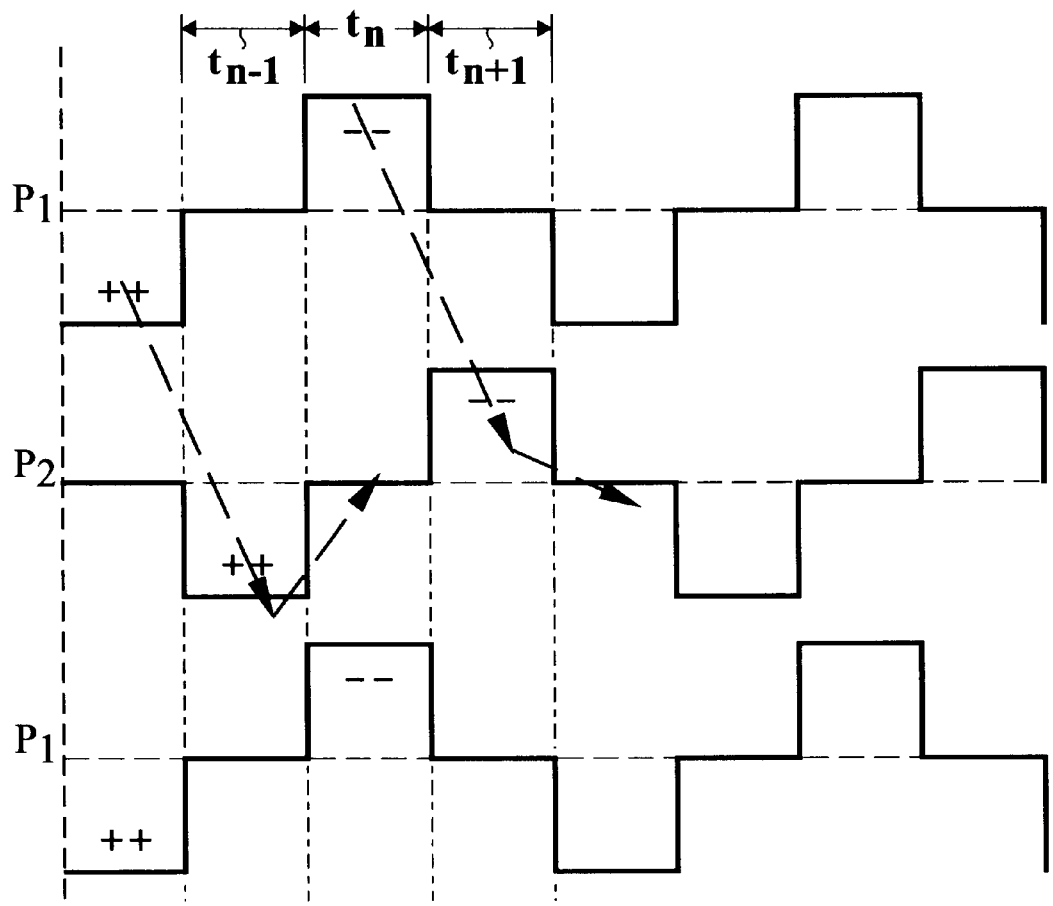
FIG. 4D shows an interrupted application of a waveform to the conductive layers of the medial plane.

As described above proper phasing of voltages on the electrodes at a pixel are required to transport fluid. Referring to FIG. 4D it can be seen that, conversely, breaking the peristaltic pattern halts the flow. This effect is used to provide non-switching states for the pixels in non-addressed rows residing in the same columns as the desirably addressed pixels. Thus, if $P_1$, $P_2$ and $P_3$ are ordered and cycled so as to transport fluid at desired column intersections for selected row, i, for example, then applying $P_1$, $P_1$, $P_3$ or $P_1$, $P_3$, $P_3$ does not transport fluid at intersection pixels in all other rows, j, where no switching is desired. Thus, by addressing rows and columns, transport will occur only at intersections where proper phasing is provided.

Figure 5:
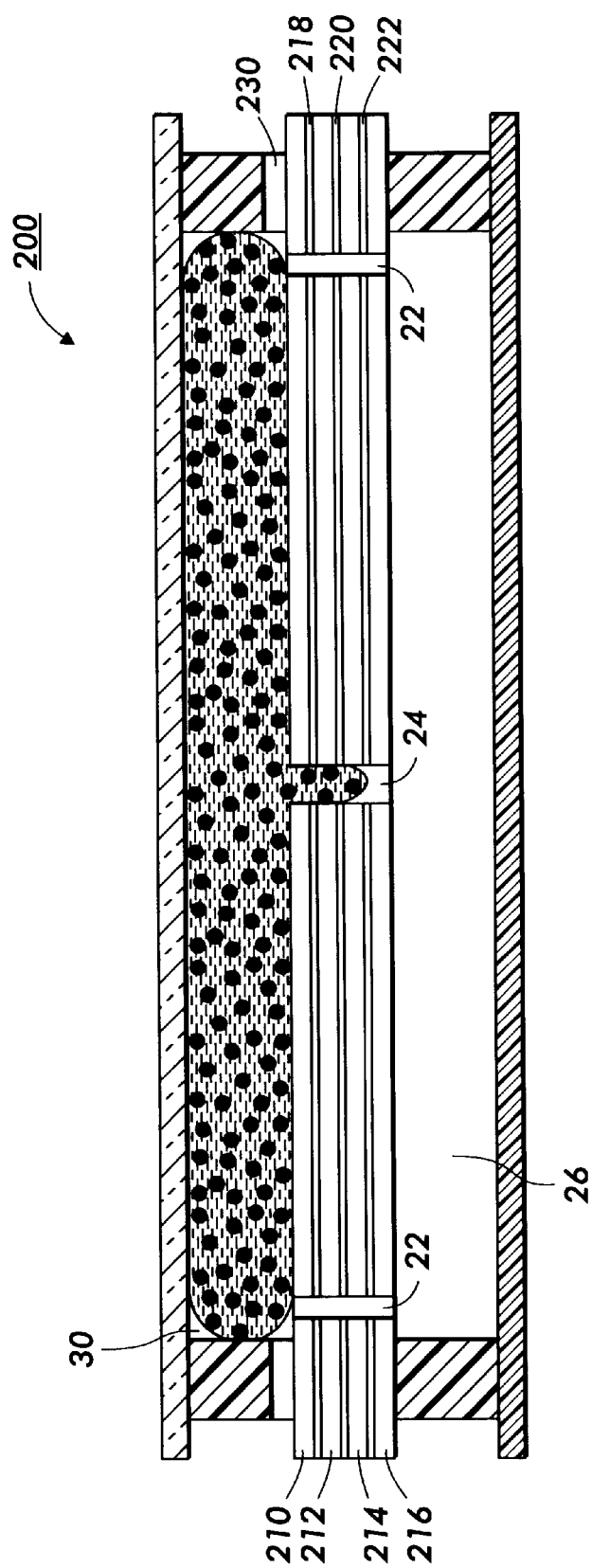
FIG. 5 shows a pixel wide cross sectional view of the electric display sheet in operation.

As a result, the wave forms $P_1$, $P_2$, and $P_3$ cause the coloring fluid to move from reservoir 26, through the opening 24, past conductive layers 222, 220 and 218, and into reservoir 30. Referring to FIG. 5, by applying the waveforms $P_1$, $P_2$, and $P_3$, to the conductive layers 222, 220 and 218 in the reverse order, coloring fluid 28 can be moved from reservoir 30 and down the opening 24 back into reservoir 26. Gas or fluid originally contained in reservoir 30 flows into reservoir 26 through apertures 22 to maintain intra-pixel equilibration. In the case that gas fills half the pixel (one reservoir) and apertures 22 are made to be non-wetting to fluid 28, then a dyed, non-pigmented fluid 28 can be used. In another embodiment, gas or fluid originally contained in reservoir 30 may also move through apertures 230 to maintain inter-pixel equilibration. Apertures 22 and/or 230 are at least half the diameter of the smallest pigment particles. For the case in which dyed, unpigmented fluids are used, then apertures 22 and/or 230 are either treated to be non-wetting or are made sufficiently small so that one fluid is not able to pass, but any gas or second fluid may pass.

Figure 6:
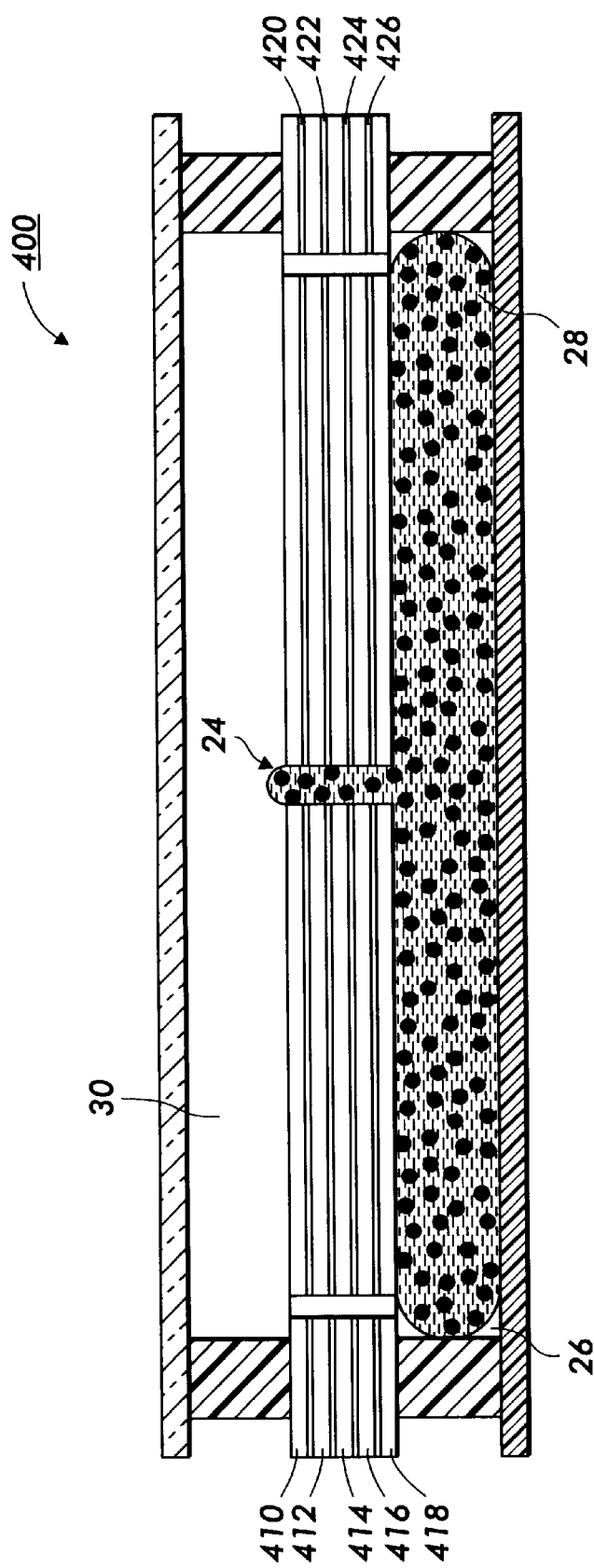
FIG. 6 shows an alternate embodiment of the medial plane.

Furthermore, the number of conductive layers can be modified to be more than three. For example, four conductive layers 420, 422, 424, and 426 can be used as shown in FIG. 6. Extra conductive layers can be used to increase the suppression of transport in non-selected pixels, and to enhance pumping in selected pixels. In this embodiment, conductive layers 420 and 426 are unpatterned and conductive layers 422 and 424 are patterned in the same manner as layers 218 and 220 respectively, as shown in FIG. 3B.

Figure 7:
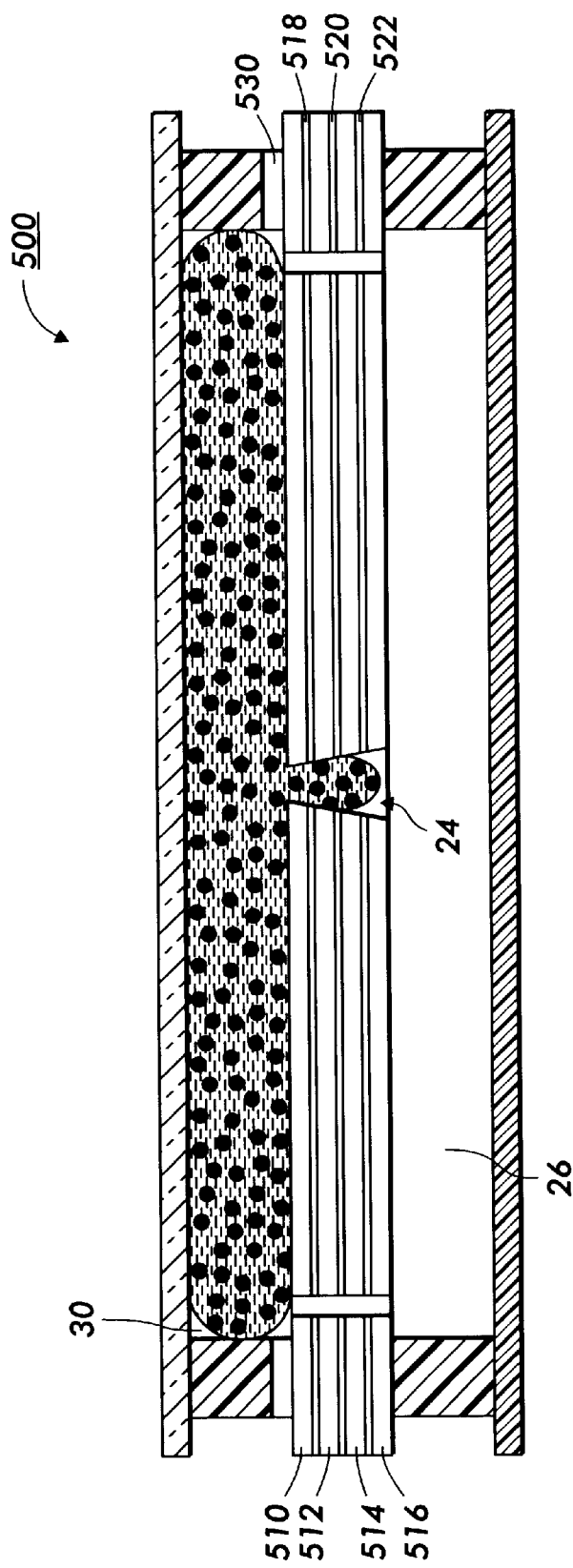
FIG. 7 shows a pixel wide cross sectional view of an alternate embodiment of the medial plane with a frustoconical aperture.
Figure 8:
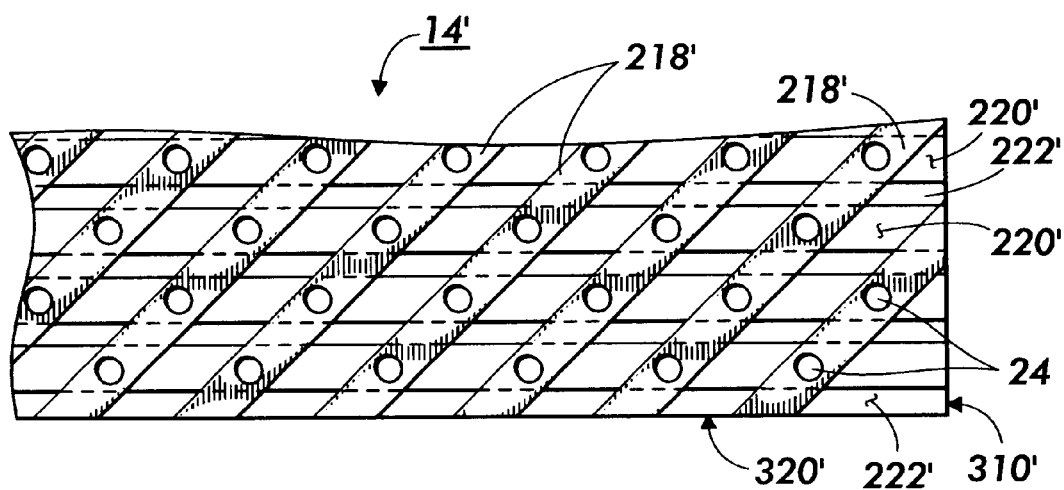
FIG. 8 shows a portion of the top view of the medial plane of an alternate embodiment of this invention.

Many different variations, combinations, and arrangements of this invention can be implemented to move the coloring fluid. For example, referring to FIG. 7, the shape of apertures 24 may be varied such that the sides are angled, rather than parallel. In the same manner, the patterned conductive layers may have different shapes or be configured differently, as shown in FIG. 8. In FIG. 8, conductive strips 340 are arranged in such a manner that they form parallel lines which are diagonal with respect to conductive strips 220'. In FIG. 8, those elements which are the same as those disclosed in the description of FIG. 3A, are designated by the same reference numerals with a prime "'" affixed thereto and have the same properties and serve the same purpose as their counterparts. In further variations apertures 24 and 22 can be hidden from viewing by masking layers (not shown).

The sheet of the present invention may be produced in a continuous process from webs of material. Webs are fed from rolls, to die cutting stage to partial lamination stage to inking stage to final lamination stage to roll, as described in U.S. application Ser. No. 09/216,829, cited above. The orifices may be cut with a laser drilling apparatus, but alternatively could be die punched. A separate operation would cut the sheet to size.

It is therefore apparent that there has been provided, in accordance with the present invention, a display sheet with a stacked electrode structure. The advantage of the display sheet disclosed in this invention over prior display sheets using a standard electric field is the more efficient movement of material from one reservoir to another and the minimization of space charge creation and field screening, and the resultant long time constants for charge re-equilibration. Accordingly, the present invention is intended to embrace all such alternatives, modifications, and variations which may fall within the spirit and scope of the following claims.

What is claimed is:

1. An internal field activated display sheet comprising:
   a first non-conductive sheet;
   a plurality of first reservoirs;
   a plurality of second reservoirs being located substantially beneath said first reservoirs;
   a medial plane interposed between said first reservoirs and said second reservoirs, wherein said medial plane comprises a plurality of layers of alternating non-conductive and conductive layers, beginning and ending with non-conductive layers, and wherein at least one conductive layer comprises a plurality of conductor means patterned in rows, and at least one conductive layer comprises a plurality of conductor means patterned in columns and oriented in non-parallel relationship to the conductor means patterned in rows, wherein said non-parallel relationship comprises an orthogonal relationship or a diagonal relationship;
   said first reservoirs and said second reservoirs being in communication with each other through at least one aperture in said medial plane;
   at least one of said reservoirs being filled with a first liquid means;
   said first liquid means being responsive to a peristaltically driven internal field within said medial plane for electrically pumping said first liquid from one reservoir into the other reservoir through said aperture; and
   a second non-conductive sheet.

2. The internal field activated display sheet according to claim 1, wherein said first liquid means is a conducting fluid.

3. The internal field activated display sheet according to claim 1, wherein said first fluid contains neutrally buoyant pigment particles.

4. The internal field activated display sheet according to claim 1, wherein the second of said reservoirs is filled with a second liquid means.

5. The internal field activated display sheet according to claim 4, wherein said first liquid means is a fluid which is immiscible with said second liquid means.

6. The internal field activated display sheet according to claim 1, wherein the second of said reservoirs is filled with a gas.

7. The internal field activated display sheet according to claim 1, wherein the first liquid means is a dyed liquid.

8. The internal field activated display sheet according to claim 1, wherein the first liquid means is a pigmented liquid.

9. The internal field activated display sheet according to claim 4, wherein the second liquid means is a clear liquid.

10. The internal field activated display sheet according to claim 4, wherein the second liquid means is a colored liquid.

11. The internal field activated display sheet according to claim 1, wherein the side walls of said aperture in said medial plane are substantially parallel.

12. The internal field activated display sheet according to claim 1, wherein the side walls of said aperture in said medial plane are substantially frustoconical.

13. The medial plane according to claim 1, further comprising at least one unpatterned conductive layer.

14. The internal field activated display sheet according to claim 1, wherein said first reservoirs and said second reservoirs are in communication with each other through a plurality of apertures in said medial plane.

15. The internal field activated display sheet according to claim 1, wherein said first non-conductive sheet comprises a material that is substantially transparent.

16. The medial plane according to claim 1, wherein at least the first non-conductive layer comprises a material that is substantially opaque.

17. The medial plane according to claim 1, wherein the plurality of conductor means on said conductive layers is associated with at least one of said apertures communicating between said first reservoir and said second reservoir.

18. The internal field activated display sheet according to claim 1, wherein said first liquid means comprises a fluid including charged particles.

19. A method for activating a display sheet with stacked electrode structure, comprising:

fabricating an internal field activated display sheet having a first non-conductive sheet, a plurality of first reservoirs, a plurality of second reservoirs being located substantially beneath said first reservoirs, a medial plane interposed between said first reservoirs and said second reservoirs, wherein said medial plane comprises a plurality of alternating non-conductive and conductive layers, beginning and ending with non-conductive layers, wherein at least one conductive layer comprises a plurality of conductor means patterned in rows, and at least one conductive layer comprises a plurality of conductor means patterned in columns and oriented in non-parallel relationship to the conductor means patterned in rows, wherein said non-parallel relationship includes an orthogonal relationship or a diagonal relationship, and wherein said first and second reservoirs are in communication with each other through at least one aperture in said medial plane, and a second non-conductive sheet;

filling at least one of said reservoirs with a first liquid means;

applying a peristaltically driven internal field within said medial plane for electrically pumping said first liquid means from at least one of said plurality of first reservoirs into at least one of said plurality of second reservoirs through said aperture.

20. The method for activating a display sheet with stacked electrode structure according to claim 19, wherein the plurality of conductor means on said conductive layers is associated with at least one of said apertures communicating between said first reservoirs and said second reservoirs.

* * * * *